Figure 1:
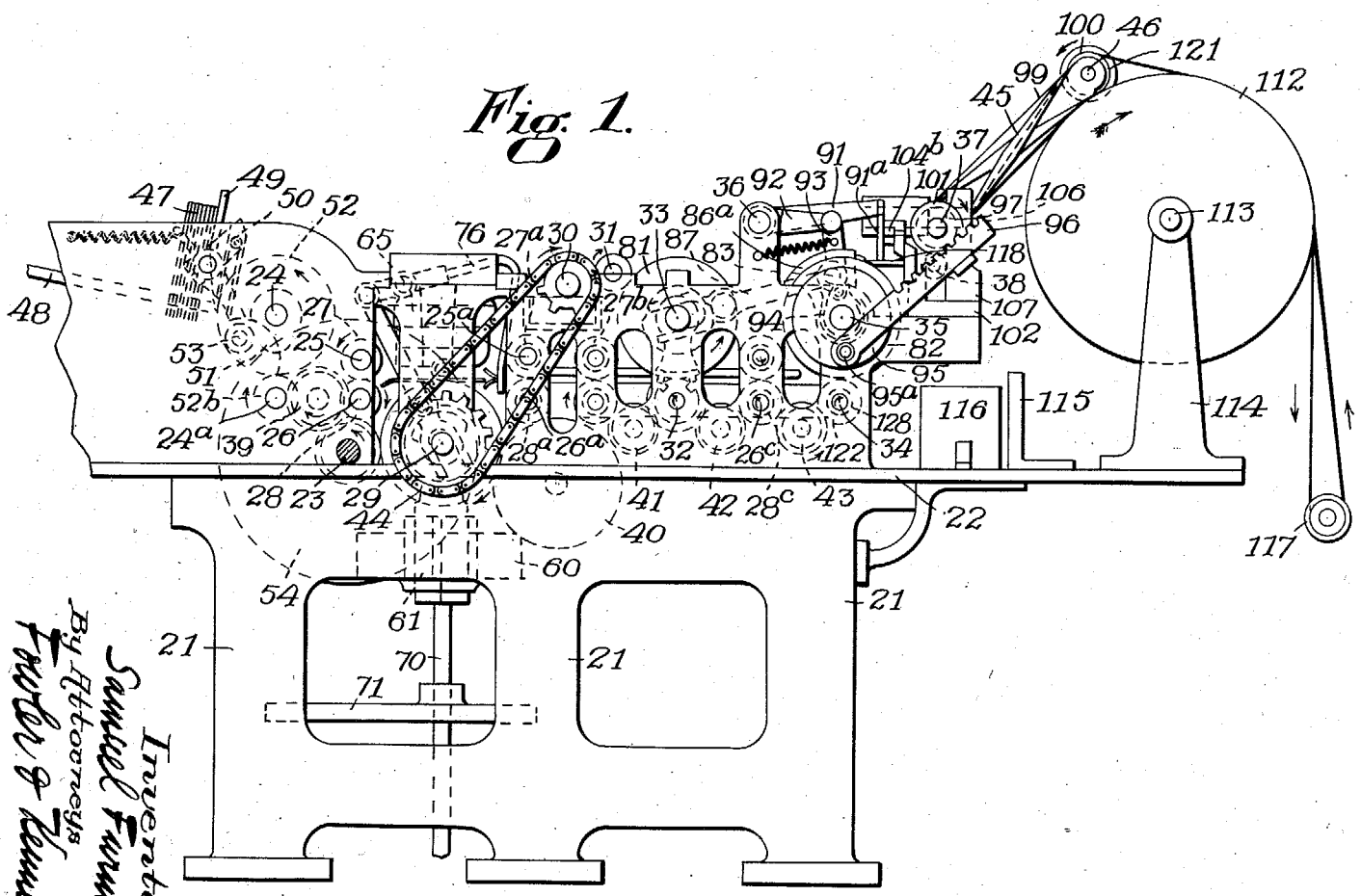

S. FURMAN.

MACHINE FOR MAKING WINDOW ENVELOP BLANKS.

APPLICATION FILED FEB. 23, 1918.

Reissued Aug. 24, 1920.

14,936.

8 SHEETS—SHEET 1.

Inventor
Samuel Furman
By Attorneys
Fowler & Kennedy

S. FURMAN.

MACHINE FOR MAKING WINDOW ENVELOP BLANKS.

APPLICATION FILED FEB. 23, 1918.

Reissued Aug. 24, 1920.

14,936.

8 SHEETS—SHEET 2.

Inventor
Samuel Furman
By Attorneys
Fowler & Kennedy

S. FURMAN.

MACHINE FOR MAKING WINDOW ENVELOP BLANKS.

APPLICATION FILED FEB. 23, 1918.

Reissued Aug. 24, 1920.

14,936.

8 SHEETS—SHEET 3.

Inventor
Samuel Furman
By Attorneys.
Fowler & Kennedy

S. FURMAN.
MACHINE FOR MAKING WINDOW ENVELOP BLANKS.
APPLICATION FILED FEB. 23, 1918.
Reissued Aug. 24, 1920. 14,936.
8 SHEETS—SHEET 4.
Fig. 5.
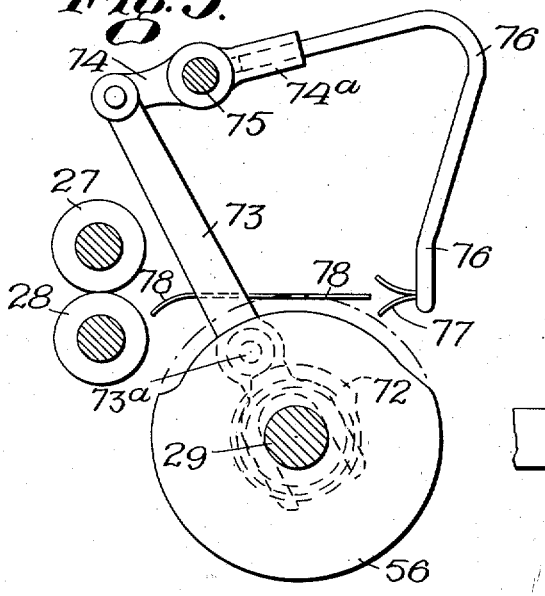
Fig. 6.
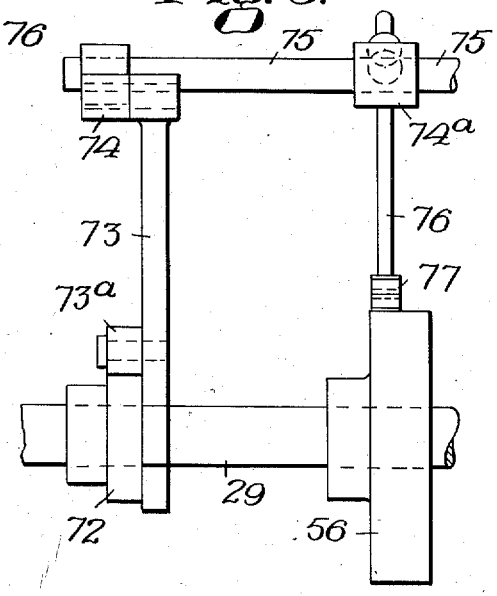
Fig. 7.
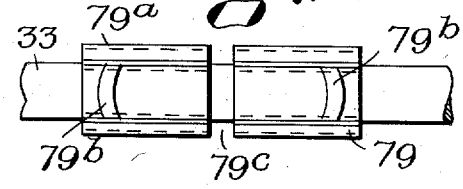
Fig. 8.
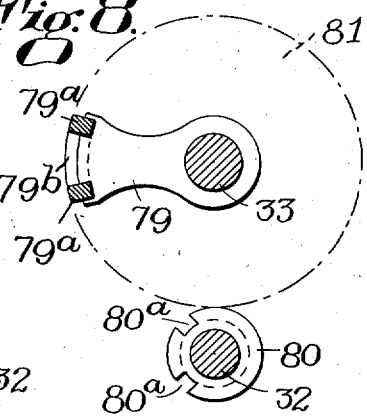
Fig. 9.
Fig. 10.
Inventor
Samuel Furman
By Attorneys.
Fowler & Kennedy

S. FURMAN.

MACHINE FOR MAKING WINDOW ENVELOP BLANKS.

APPLICATION FILED FEB. 23, 1918.

Reissued Aug. 24, 1920. 14,936.

8 SHEETS—SHEET 5.

Inventor
Samuel Furman
By Attorneys
Fowler & Kennedy

S. FURMAN.

MACHINE FOR MAKING WINDOW ENVELOP BLANKS.

APPLICATION FILED FEB. 23, 1918.

Reissued Aug. 24, 1920. 14,936.

8 SHEETS—SHEET 6.

Inventor
Samuel Furman
By Attorneys
Fowler & Kennedy

S. FURMAN.

MACHINE FOR MAKING WINDOW ENVELOP BLANKS.

APPLICATION FILED FEB. 23, 1918.

Reissued Aug. 24, 1920.

14,936.

8 SHEETS—SHEET 7.

Inventor
Samuel Furman
By Attorneys.
Fowler & Kennedy

S. FURMAN.

MACHINE FOR MAKING WINDOW ENVELOP BLANKS.

APPLICATION FILED FEB. 23, 1918.

Reissued Aug. 24, 1920.

14,936.

8 SHEETS—SHEET 8.

Inventor
Samuel Furman
By Attorneys.
Fowler & Kennedy

UNITED STATES PATENT OFFICE.

SAMUEL FURMAN, OF WORCESTER, MASSACHUSETTS, ASSIGNOR TO UNITED STATES ENVELOPE COMPANY, OF SPRINGFIELD, MASSACHUSETTS, A CORPORATION OF MAINE.

MACHINE FOR MAKING WINDOW-ENVELOP BLANKS.

14,936. Specification of Reissued Letters Patent. Reissued Aug. 24, 1920.

Original No. 1,182,364, dated May 9, 1916, Serial No. 31,484, filed June 1, 1915. Application for reissue filed February 23, 1918. Serial No. 218,909.

*To all whom it may concern:*

Be it known that I, SAMUEL FURMAN, a citizen of the United States, residing at Worcester, in the county of Worcester and Commonwealth of Massachusetts, have invented a new and useful Improvement in Machines for Making Window-Envelop Blanks, of which the following is a specification.

My invention relates to improvements in machines for making window envelop blanks, comprising mechanisms for performing any or all of the following functions: 1. Feeding the initially cut blanks into and through the machine. 2. Cutting the window opening in each blank. 3. Gumming a marginal space on the blank adjacent to and encompassing the window opening. 4. Taking the transparent paper from a roll, cutting off patches of a suitable width, and applying the same on to the gummed spaces of the envelop blanks, to form suitable windows for said blanks.

My invention consists in the novel features hereinafter more fully described.

The objects of my improvement are: First to produce a machine for making window envelop blanks, which will perform its functions in a more perfect way and with a smaller expenditure of time and energy. Second, to have the machine of high speed and relatively small size for its output. Third, to have the same machine foolproof, simple, durable, inexpensive, and its parts readily adjustable and easily replaceable when worn out. I attain these objects by the mechanism illustrated in the accompanying drawings, in which—

Figure 2:
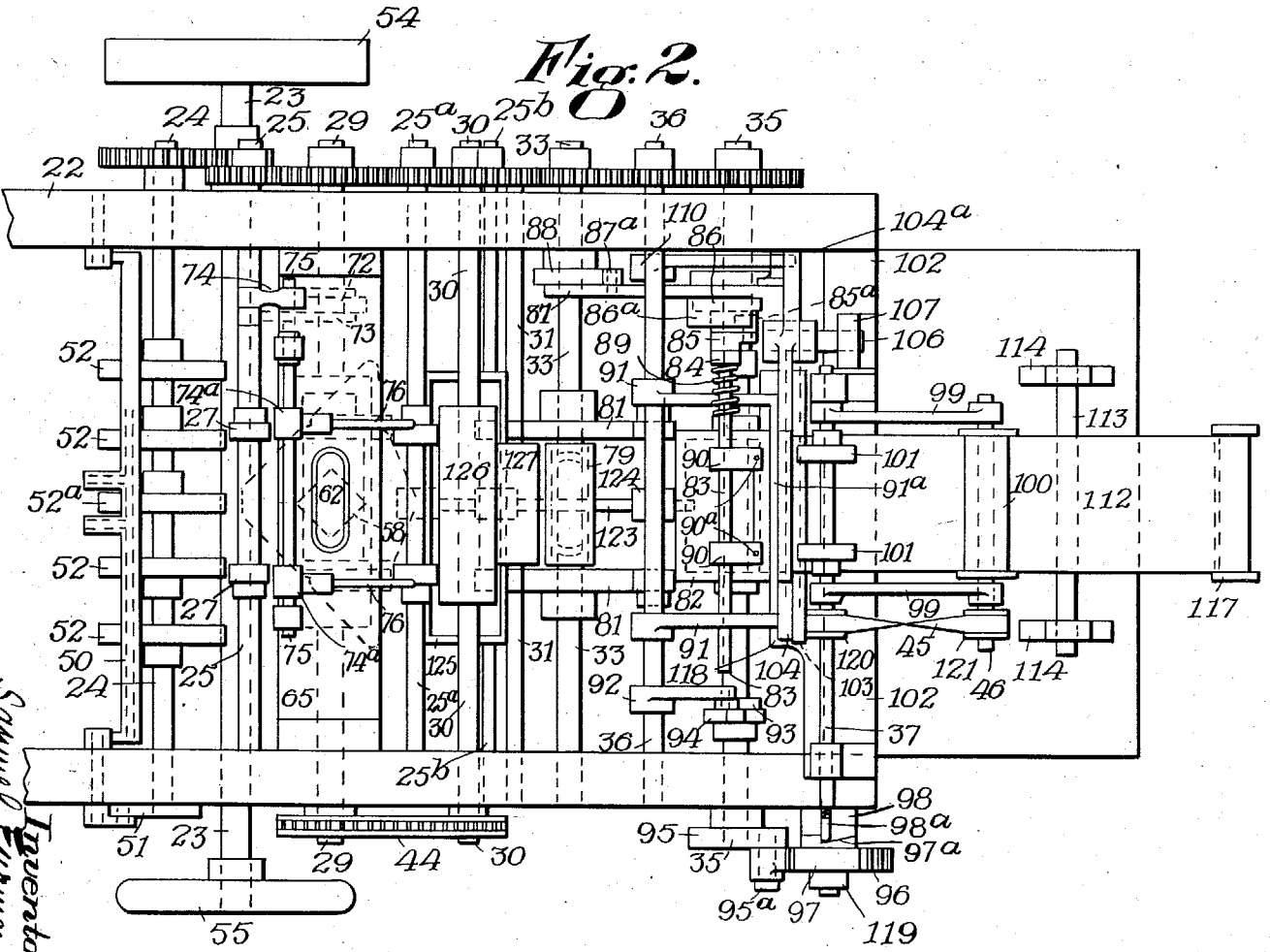
Figure 3:
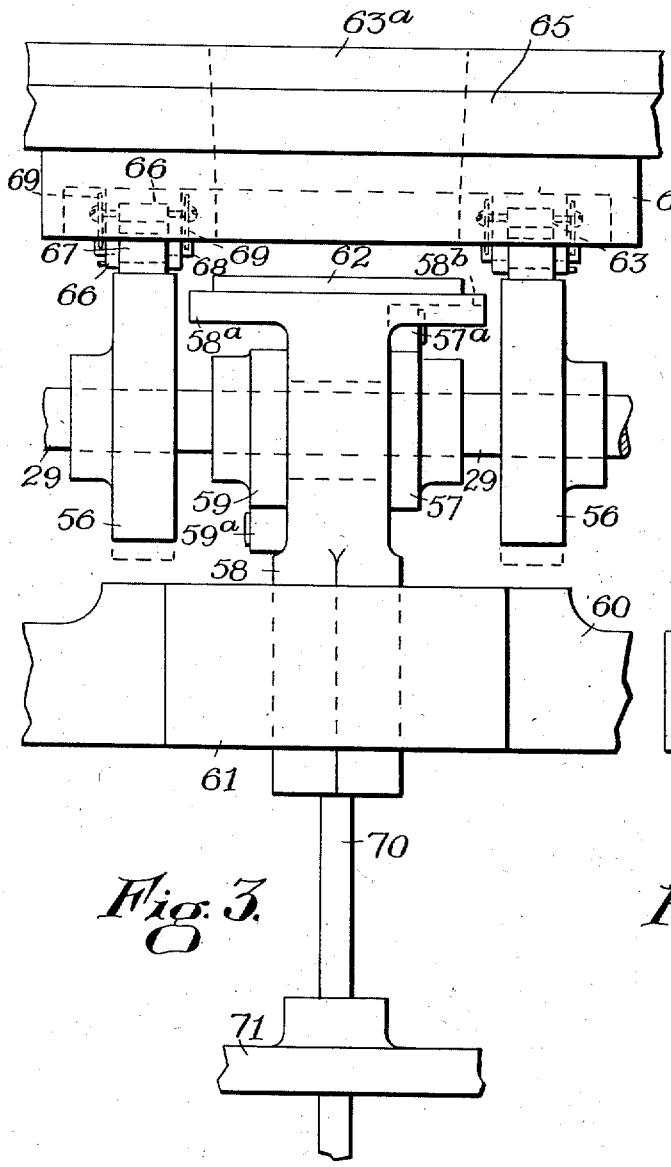
Figure 4:
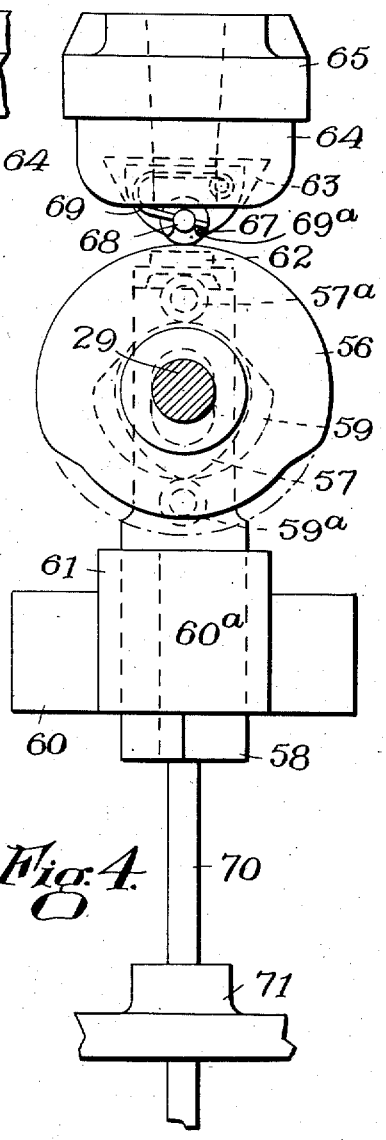

Figure 1 is a side elevation of the entire machine; Fig. 2 is a plan of the entire machine, omitting some details, for the sake of clearness; Fig. 3 is a partial end view showing the mechanism for punching or cutting the window opening in the blanks; Fig. 4 is a side elevation of the same punching mechanism shown in Fig. 3, Figs. 3 and 4 being drawn to a larger scale than Figs. 1 and 2, and omitting the plate 78, for the sake of clearness.

Figure 11:
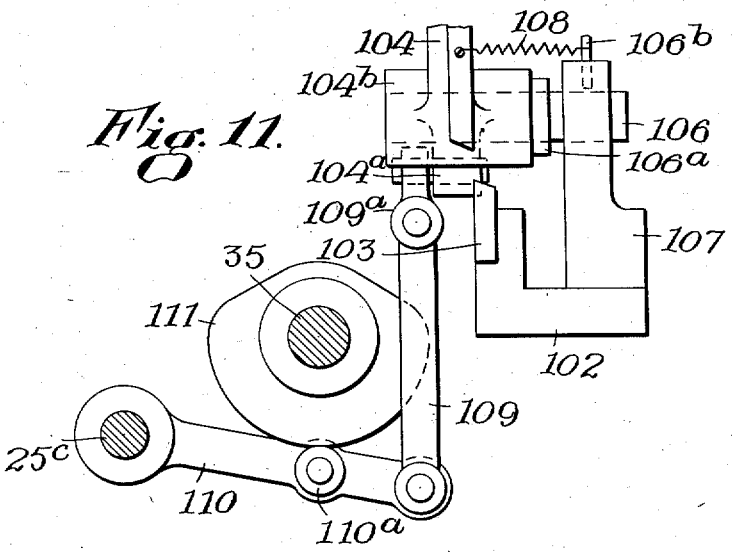
Figure 13:
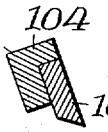
Figure 12:
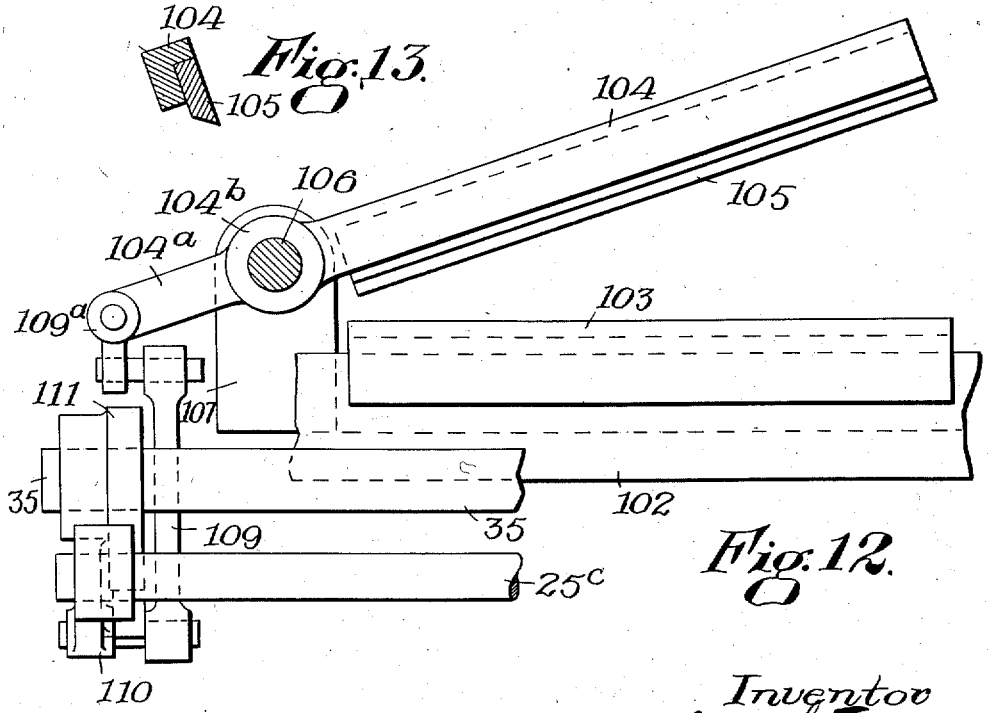
Figure 14:
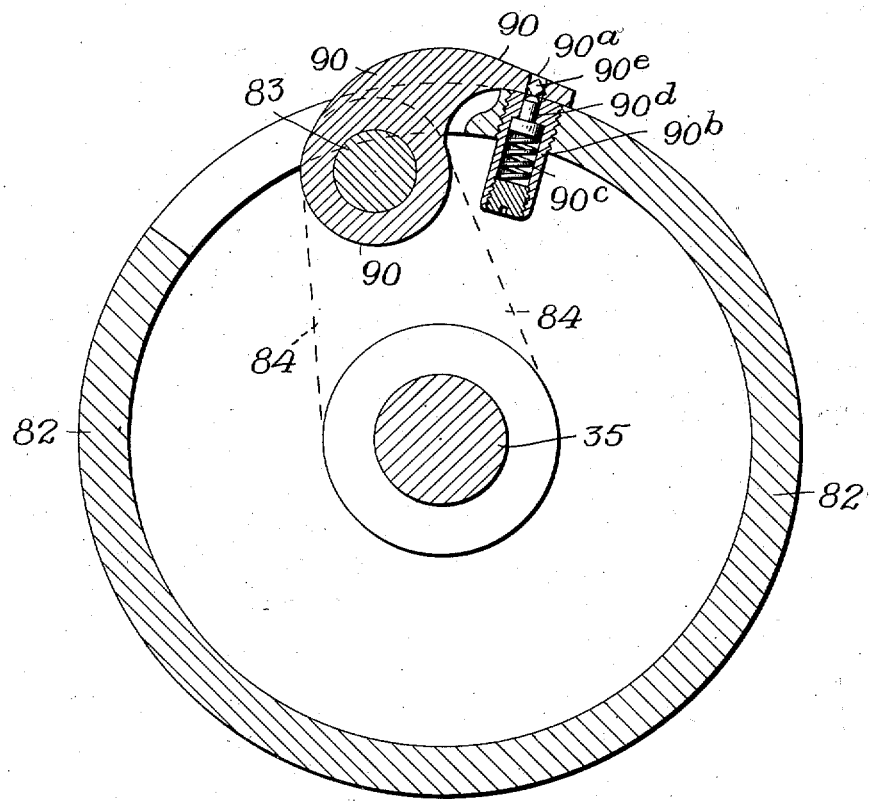
Figure 15:
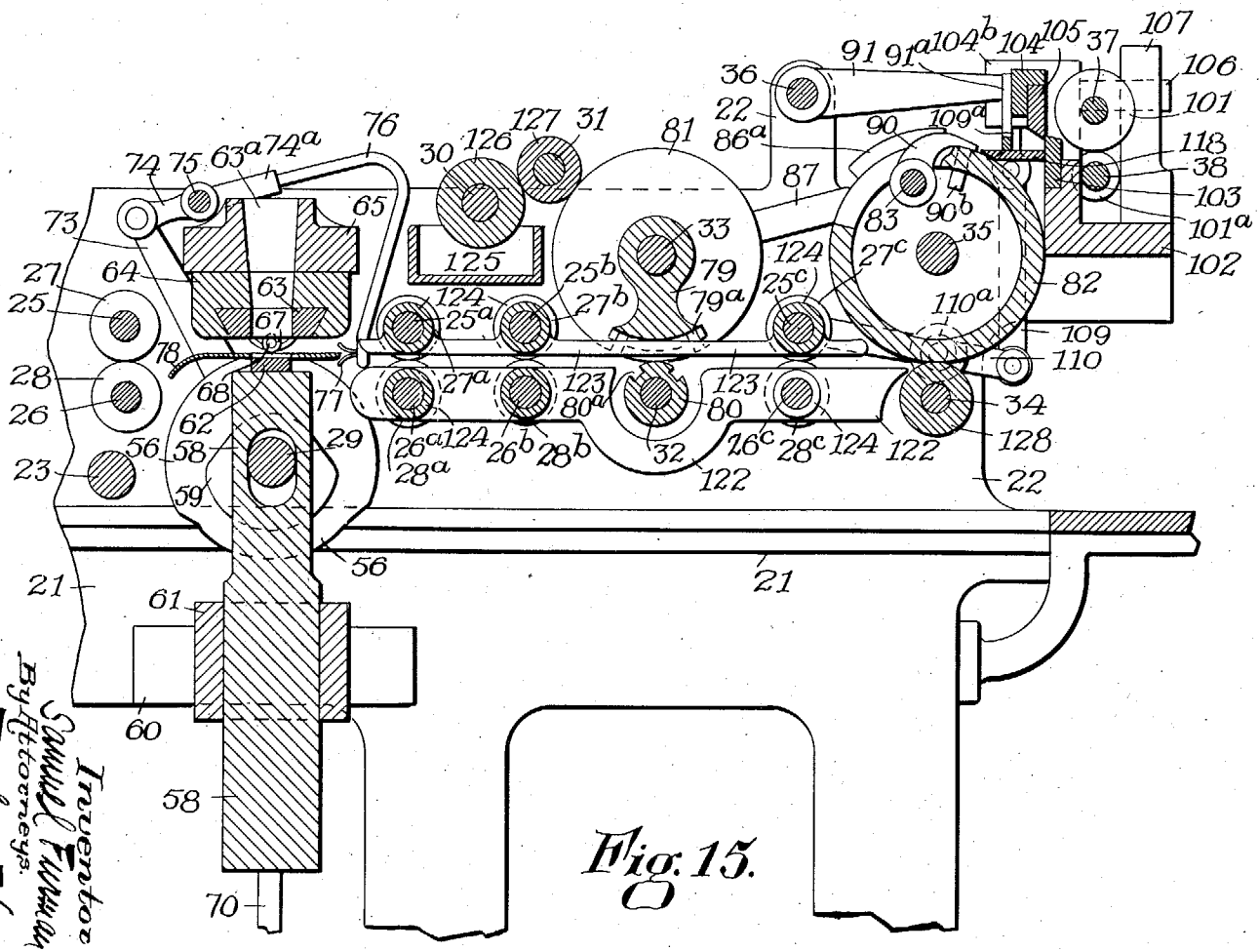
Figure 16:
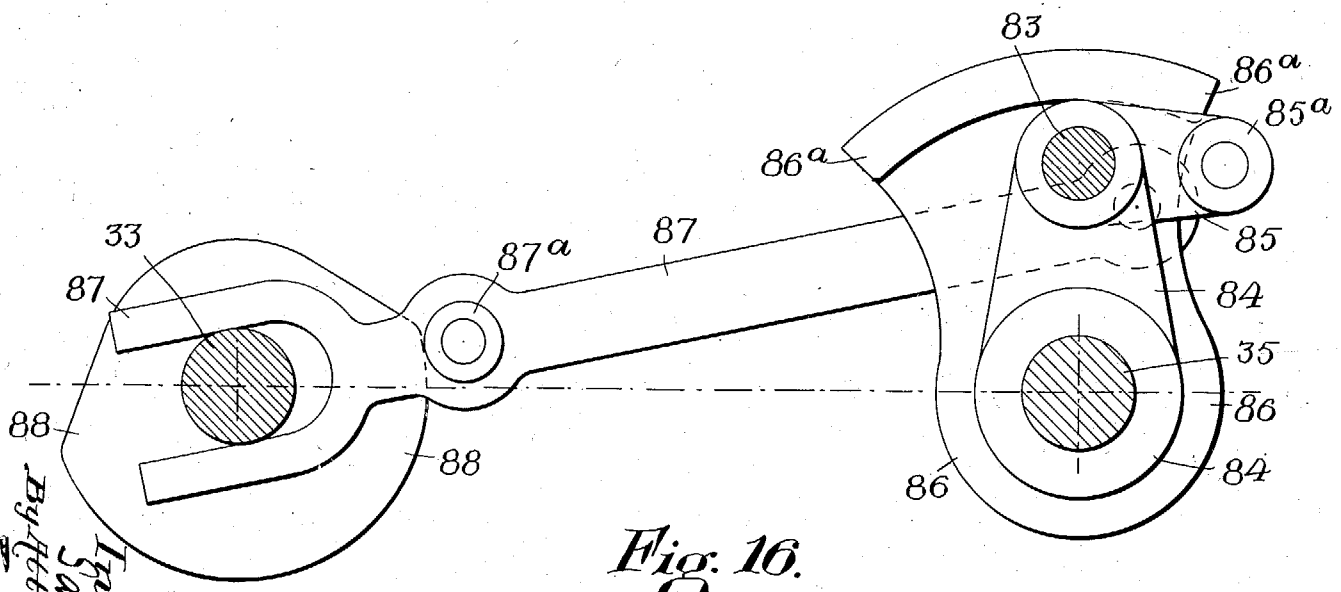

Fig. 5 is a side elevation of the mechanism for operating the stops 76, used in conjunction with the window cutting mechanism above mentioned, and is hereinafter more fully described; Fig. 6 is an end view of the same stop operating mechanism, showing only one of the two stops with part of their spindle and with the device actuating the same, as is hereinafter more fully described. Fig. 7 is an end elevation of the revolving gumming member 79 connected to shaft 33; Fig. 8 is a side elevation of the same, with the rubber strips $79^a$ shown in section, and to a larger scale than in Fig. 1. Fig. 9 is an end elevation of the lower gumming cylinder, which is connected to shaft 32; Fig. 10 is a side elevation of the same, also drawn to a larger scale than in Fig. 1. Fig. 11 is a side elevation of the shearing mechanism used for cutting off patches from the roll of transparent paper; Fig. 12 is an end elevation of the same. Fig. 13 is a section of the forward arm of the rocking beam 104 with the upper blade 105 of the shearing device. Fig. 14 is a cross section on a large scale of the cylinder 82 and one of the grippers 90, showing the spring pressed pin $90^d$ and details of the same. Fig. 15 is a longitudinal section, drawn to a larger scale, on the center line of Fig. 2, showing the main part of my machine for making window envelop blanks, and leaving out some details at the extreme ends of Fig. 2. Fig. 16 is an elevation of the revolving arm and oscillating member of the patch-applying mechanism and of the means for actuating the same.

All fastenings are omitted from the drawings, also sundry standard machine parts and known devices.

Similar numerals and letters refer to similar parts throughout the several views, as follows:

21 is the lower frame of the machine.

22 is the upper machine frame.

23 is the main power shaft.

24 is the upper shaft of the initial feeding mechanism, shown at the left of the machine in Figs. 1 and 2; $24^a$ is the lower shaft thereof.

25 and 26, also $25^a$, $26^a$, $25^b$, $26^b$, $25^c$ and $26^c$ are shafts for pairs of a train of small feed rolls 27, 28, $27^a$, $28^a$, $27^b$, $28^b$, $27^c$ and $28^c$ respectively.

29 is the shaft operating the window punching or cutting mechanism, illustrated more clearly in Figs. 3 and 4.

30 is the shaft connected to the gum receiving cylinder 126.

31 is the shaft connected to the gum transferring cylinder 127.

32 is the shaft supporting the lower gumming cylinder 80, which is more clearly shown in Figs. 9 and 10.

33 is the shaft connected to the revolving gumming member 79, which is shown more clearly in Figs. 7 and 8; it also carries the pair of large feeding disks 81.

34 is the shaft connected to the lower patch applying cylinder or blank bed 128.

35 is the shaft connected to the upper patch applying cylinder 82.

36 is the shaft which actuates the clamp 91[a] for the transparent paper.

37 and 38 are shafts for actuating certain of the instrumentalities of the mechanism for feeding the transparent paper, as hereinafter more fully described.

The direction of rotation of the various shafts 23 to 38 inclusive is indicated by the arrows appearing on Fig. 1. All of these shafts derive their rotation from the main driving shaft 23 through suitable intermeshing gears, sprockets and the like, indicated generally in plan on Fig. 2; it will be understood that these various elements of the driving mechanism of the machine form of themselves no part of my invention, and hence a description thereof in detail is unnecessary. It is sufficient merely to indicate, on Fig. 1, the several intermediate power transmission members which establish the driving connections between the gears of the several shafts, as follows:

39 is the intermediate gear transmitting power from shaft 23 to shaft 24.

40 is an intermediate gear transmitting power from shaft 29 to shafts 26[a] and 26[b].

41 is an intermediate gear transmitting power from shaft 26[b] to shaft 32.

42 is an intermediate gear transmitting power from shaft 32 to shaft 26[c].

43 is an intermediate gear transmitting power from shaft 26[c] to shaft 34.

44 is a chain for transmitting power from shaft 29 to shaft 30, in conjunction with the sprockets shown in Fig. 1.

The blanks to be operated upon by the machine are supported in a pile 47, Fig. 1, with their edges resting on suitable bars 48, and resting in an inclined position against a plate 49. Said blanks have been previously cut to the desired outline, but are without any window openings, it being the function of the machine, as hereinafter described in detail, to cut a window opening and to apply a transparent patch thereto, with respect to each individual blank removed from the pile or stack 47. Suitable mechanism is provided for picking off each individual blank from the pile 47 and presenting it in proper position for progressive movement through the machine. Such mechanism, which forms of itself no part of my present invention, is here shown by way of example as a suction device 50, actuated by a cam 51 on shaft 24. In a manner common to devices of this class, the suction device 50 is operated to present each individual blank to a gripping device, such as 53, carried by a disk 52[a] on shaft 24. Each blank thus seized is delivered edgewise to the bight of continuously rotating upper and lower feeding disks 52 and 52[b], Fig. 2, on the shafts 24 and 24[a] respectively, which in turn forward the blanks to the initial feed rolls 27 and 28, above referred to.

54 is the power pulley connected to shaft 23; 55 is a large hand wheel connected to the same shaft.

56 are two recessed disks connected to shaft 29.

57 is a cam for raising the sliding block 58.

58[a] and 58[b] are the lateral extensions of the upper end of block 58.

59 is the cam for lowering the block 58.

Each blank as forwarded by the rolls 27 and 28 is received on a plate 78, located directly above the shaft 29. Said shaft 29 carries the two cams 57 and 59, for raising and lowering the sliding block 58, said cams operating in contact with rollers 57[a] and 59[a] respectively, which are connected, as shown in Fig. 3, to the opposing overhanging portions of said block 58. The block 58 is guided in its vertical reciprocations by a suitable guide 60[a] carried by a transverse bar 60 of the lower frame 21, and having a removable cover 61. The block 58 carries on its upper end a punch or male die 62 for coöperation with a corresponding female die 63 above the plate 78, and carried by a member 64 which is secured to a transverse bar 65 of the upper frame 22. With a blank in position on the plate 78, and held stationary by the interposed stops 76, 77, hereinafter described, the upward movement of die 62 through a corresponding opening in the plate 78 forms the window in the blank, the material removed being retained by the female die 63 after the male die 62 descends. The waste material passes out upwardly through a tapering opening 63[a], above the opening of the female die 63.

The blank during this window cutting operation remains stationary on the plate 78, in position to be fed forward by the disks 56 as soon as their segmental cutaway portions have traveled past. These feeding disks 56 coöperate with rollers 67 which are carried in brackets 66 depending from the member 64. The shafts or pins 68 of rollers 67 work in suitable slots in the brackets 66, and the rollers are pressed against the peripheries of disks 56 by springs 69. When the feed portions of disks 56 are operative, the blank is fed forward, after the window cutting operation, between the bight of rollers 67 and said disks; while the blank is having the window cut therein, the rollers 67 are held out of contact with the peripheries of the disks, by the engagement of springs 69 with pins 69[a], Fig. 4.

70 is an extension or sliding rod connected to block 58; 71 is a guide for said rod 70.

76 is a pair of stops for the blanks adapted to keep each blank in place while a window is being punched or cut in it by the punch 62 and die 63. 74[a] is a socket adapted to hold each of said stops 76, which can be adjusted in position in said sockets 74[a] for various positions of the window cut in the blank.

75 is a spindle to which both sockets 74[a] are connected, also the arm 74, which is adapted to oscillate said spindle 75. 73 is a fork actuating said arm 74; 73[a] is an anti-friction or cam roller on said fork 73. 72 is a cam connected to shaft 29 and in contact with said roller 73[a].

77 is a pair of spring clamps connected to the lower end of each of stops 76 and adapted to receive the blank and keep it from rebounding or glancing back.

After the window in the blank has been cut, as above described, the stops 76 are elevated, leaving the blank free to be moved forward by the disks 56 and rollers 67, for the operation of gumming around the margin of the window opening, as hereinafter described.

79 is a revolving gumming member, connected to shaft 33. 79[a] are two longitudinal rubber strips connected to the face of said member 79. 79[b] are two curved rubber strips on the face of said member 79. 79[c] is a circular groove across the cylindrical surface of the member 79, in the plane of rotation thereof, for the purpose hereinafter described. 80 is a cylinder adapted to support an envelop blank under the revolving member 79. 80[a] are longitudinal grooves in the surface of the cylinder 80, adapted to register with said strips 79[a] of the member 79. 80[b] are curved grooves in the surface of the cylinder 80, adapted to register with said strips 79[b] of the member 79.

The gumming devices 79[a] and 79[b] of the member 79 receive gum in each rotation thereof from the surface of a gum transferring cylinder 127 mounted on the shaft 31. The cylinder 127 rotates in contact with a gumming roll 126 of ordinary construction, partially immersed in a gum box 125, Fig. 15. As the blanks are successively fed forward by the feeding rolls 27[a], 28[a] and 27[b], 28[b], the margins of the window openings receive a coating of gum from the gumming devices of member 79, the movement of the blanks, while being gummed, being continued by the disks 81 on shaft 33 coöperating with the cylinder 80 on shaft 32. In their passage between the window cutting mechanism and the window gumming mechanism, as above described, the blanks are guided by upper and lower stationary guides 123 and 122, Fig. 15, said guides having sockets 124 by which they are supported from the several shafts 25[a], 25[b], 25[c] and 26[a], 26[b] and 26[c] of the pairs of blank feeding rolls. The groove 79[c] of member 79 is provided for the reception of upper guide 123; lower guide 122 is shown as passing below the cylinder 80; obviously this guide, like the upper guide 123, could be constructed to pass through the groove 80[c] of said cylinder 80.

After being gummed around their window openings as above described, the blanks are successively fed by feed rolls 27[c], 28[c] to the patch applying mechanism, as hereinafter described.

82 is the upper patch-applying cylinder, connected to shaft 35; 128 is the lower patch-applying cylinder connected to shaft 34. 84 is an arm connected to said shaft 35. 83 is a revolving and rocking spindle journaled in said cylinder 82 and said arm 84. 85 is a swinging arm connected at one end to said spindle 83 and adapted to revolve with it. 85[a] is a cam roller at the other end of arm 85. 86[a] is a plate having a variable position, and adapted to intercept said roller 85[a], thereby deflecting said arm 85 and oscillating said spindle 83. 86 is a block, swiveled on shaft 35, and having said plate 86[a] fastened thereto. 87 is a fork pivotally connected at one end to said block 86 and guided at the other end on shaft 33 in the manner shown in the drawings. 87[a] is a cam roller on said fork 87. 88 is a cam connected to shaft 33 and in contact with said roller 87[a]. 89 is a torsional spring connected at one end to said spindle 83, and at the other end to said arm 84 supporting said spindle 83, and adapted to return said arm 85 to its original position after having been deflected by said plate 86[a]. 90 are a pair of grippers connected to said spindle 83 and adapted to grip the transparent paper, as is hereinafter described.

Each gripper 90 provides a small opening 90[a] adapted to receive the end of a spring pressed pin 90[d], as shown in Fig. 14. The pins 90[d] are carried in sockets 90[b], screw threaded into the cylinder 82. Each pin is yieldingly pressed outward in its socket by a spring 90[c], to hold the end of the pin, which terminates in a spear head or spike 90[e], within the corresponding opening 90[a] of the gripper.

By means of devices hereinafter described, the transparent patch material is cut off in position to be seized by the grippers 90 upon each rotation of cylinder 82. This seizure is accompanied by the minute perforation of the patch material by spikes 90[e] of pins 90[d], as the grippers 90 are operated to pinch the projecting edge of the patch. The counterclockwise rotation of cylinder 82 moves the patch into position for rolling application to the gummed blank, and at the proper time in this movement the grippers 90 are moved outwardly away from the patch by the quick motion imparted by fork 87, plate 86[a] and arm 84, as above described. The patch, however, is retained from falling away from the cylinder 82 by the perforating spears 90[e]; when said spears, in the rotation of the cylinder 82, are brought into contact with the blank on blank bed 128, they are pushed in inwardly against the pressure of their springs 90[c] and thereby release the patch, so as to permit its application to the blank then passing between the cylinders 82 and 128.

91[a] is a clamp for holding the transparent paper down to a table 118 while it is being cut and until seized by the grippers 90. 91 are a pair of arms carrying said clamp 91[a] and connected to rocking shaft 36.

92 is an arm connected at one end to shaft 36 and actuating the same and at the other end to a fork 93 which is guided by shaft 35.

94 is a cam connected to shaft 35 and actuating fork 93.

95 is a disk connected to shaft 35 at one end thereof; 95[a] is a pin carried by disk 95. 96 is a rack swiveled at one end on said pin 95[a], the other end thereof sliding in a flat socket 119, which is swiveled on shaft 37. 97 is a pinion connected to said shaft 37, and adapted to mesh with said rack 96. 97[a] are three inclined recesses in the side of said pinion 97. 98[a] is a spring pressed pin located in an opening in collar 98 and adapted to project into said recesses 97[a], whereby an intermittent motion is imparted to said spindle 37 by the action of said rack 96.

99 are a pair of drop arms swiveled at one end on shaft 37, and carrying at the other end the spindle 46. 120 is a pulley connected to said shaft 37 and transmitting motion by means of the crossed belt 45 to the pulley 121 connected to said spindle 46. 100 is a flanged roller connected to said spindle 46 and having frictional contact with the roll of transparent paper 112, thereby causing the same to turn in the direction of the arrow.

113 is a shaft connected to the paper roll 112; 114 is a pair of suitable brackets for said shaft 113.

117 is a load for the tape of transparent paper which is first unwound forward; then it passes downward under the load 117, forming a loop around it, then it passes upward and over the roller 100, then under a pair of feed disks 101, connected to shaft 37, then over the stationary blade 103, supported by the transverse bar 102, and on to the table 118, where it is held down by the clamp 91[a] until cut off by the upper blade 105, which forms a shear with said stationary blade 103.

104 is an oscillating beam to which said blade 105 is connected. 106 is a pin on which said beam 104 is swiveled by means of the sleeve 104[b]. 104[a] is an arm formed in one with said sleeve 104[b] and said beam 104; it is connected to the vertical link 109 by means of the universal joint 109[a]. 107 is a bracket for the pin 106. 106[a] is a collar on the pin 106; 106[b] is a set-screw securing said pin 106 to said bracket 107. 108 is a tensile spring connected at one end to said beam 104 and at the other end to said set-screw 106[b].

110 is a link swiveled on the shaft 25[c], and connected to the lower end of the link 109; 110[a] is a cam roller on said link 110. 111 is a cam, connected to shaft 35, in contact with said roller 110[a], and acting in conjunction with a suitable spring, not shown in the drawings for the sake of clearness, thereby actuating the links 110, 109, the arm 104[a] and beam 104 carrying said blade 105; said spring is connected at one end thereof to said link 110, and at the other end to the frame 22 of the machine.

115 is a pair of stationary posts; 116 is a pair of jogging plates for the completed envelop blanks.

The operation of my machine for making window envelop blanks is as follows: The blanks are taken from the pile 47 by the suction bar 50 and brought within reach of the gripper 53 on the middle feed disk 52[a]; the gripper releases the blank when it is taken up by and between the feed disks 52, 52[a] on the shaft 24 and the set of feed rolls 52[b] on the shaft 24[a], directly under the shaft 24 and disks 52. The blank is then delivered to the rolls 27 and 28, which in turn pass it to the stripping plate 78 and the recessed disks 56, where it is halted by the pair of stops 76 and kept from glancing back by the spring clamps 77 attached to the foot of each of the stops 76. The punch 62, in conjunction with the die 63, then cuts a window opening in the blank; the strip of waste is held at first in the opening 63[a] until it is loosened by subsequent strips, and it is gradually forced up the tapering passage 63[a]. While the blank is being punched, the disk 56 has its recessed part of the periphery adjacent thereto; thereafter the stops 76 are raised by the mechanism shown in Figs. 5 and 6, and simultaneously the blank is seized by and between the full part of the periphery of the disks 56 and the spring pressed rollers 67, and passed on to the feed rolls 27[a], 27[b] and 28[a], 28[b] respectively between the guides 122 and 123, from which it passes to the gumming cylinder 80, under the revolving gumming member 79 and feeding disks 81. The gum is taken from the box 125 by the cylinder 126 and passed to the cylinder 127, from which it is taken by the rubber strips 79[a] and 79[b] and delivered to the blank, which is then passed between the feed rolls 27[c] and 28[c], then on to the lower patch-applying cylinder or blank bed 128, under the upper patch-applying cylinder 82, which operates in the manner hereinbefore described. From the patch-applying cylinder the blank passes completed to the joggers 116.

The following are some of the special features in the design of my machine for making window envelop blanks, which can readily be seen from the drawings: In my window punching mechanism the blank is kept stationary until the operation is completed; this is accomplished by means of the recessed disks discontinuing the feed, in conjunction with the stops 76 and spring clamps 77. To insure a feeding grip on the blank after cutting the window opening, the spring pressed roller 67 is employed, in conjunction with the recessed disks 56 above referred to. The patch-applying cylinder 82, with the revolving spindle 83, spring 89, swinging arm 85 and cam roller 85[a], acts in conjunction with the plates 86[a], oscillating block 86 and the mechanism operating the same for the purpose of imparting a quick and ready motion to the grippers 90 in seizing the patch of transparent paper as soon as it is cut, and in releasing the same. The grippers 90 have each an opening 90[a] adapted to receive a spring pressed pin for making a positive grip of the thin and slippery patch of transparent paper.

While I have shown and described a preferred embodiment of my invention, it is obvious that various changes and modifications of the structure may be resorted to without departing in any manner from the spirit of the invention as exemplified in the appended claims.

I claim—

1. In a machine for making window envelop blanks, a patch-applying mechanism, comprising a rotary carrier for patches of transparent paper, a gripper or grippers on said carrier, said gripper or grippers being adapted to seize said patches, one at a time, and transfer the same to a blank in the rotation of said carrier, a spindle, pivotally connecting said gripper or grippers to said carrier, a spring for keeping said gripper or grippers open, a revolving arm connected to said spindle and adapted to revolve therewith, a deflecting member, adapted to intercept the outer end of said revolving arm during a proper phase in its revolution, thereby closing said gripper or grippers against the tension of said spring, and an oscillating member adapted to impart a quick and sudden motion to said deflecting member during the time of its intercepting the outer end of said arm and thereby imparting a quick and sudden motion to said gripper or grippers during said operation of seizing said patches.

2. A machine for making window envelop blanks, comprising means for cutting window openings in successive blanks, a blank feeding means for moving successive blanks into and away from cutting position, said feeding means including a pair of disks having recessed portions which prevent movement of the blank when in cutting position, and adjustable means for arresting the forward movement of each blank when it reaches cutting position.

3. A machine for making window envelop blanks, comprising means for cutting window openings in successive blanks, a blank feeding means for moving successive blanks into and away from cutting position, said feeding means including a pair of disks having recessed portions which prevent movement of the blank when in cutting position, adjustable means for arresting the forward movement of each blank when it reaches cutting position, and means carried by said arresting means for preventing the rebound of each blank from cutting position.

4. A machine for making window envelop blanks, comprising means for feeding successive blanks, said feeding means including a pair of disks having recessed portions adapted to discontinue momentarily the movement of each blank, positive means for intercepting each blank during the period of the discontinuance of its movement by said disks, and means for cutting a window opening in each blank while so intercepted.

5. In a machine for making window envelop blanks, a patch applying mechanism comprising a rotary carrier for patches of transparent paper, a blank bed in contact with said rotary carrier, a suitable gripper or grippers and a spring pressed pin on said patch carrier, said gripper or grippers having an opening near the end thereof, and said spring pressed pin being adapted to enter said opening, said gripper or grippers being adapted to seize said patches, one at a time, and secure the same to said pin, which is adapted to take a positive hold of said patches and recede into said patch carrier, when brought into contact with said blank bed, and thereby release said patches and apply the same to said blanks.

6. In a machine for making window envelop blanks, a patch applying mechanism comprising a rotary carrier for patches of transparent paper, a blank bed in contact with said rotary carrier, a suitable gripper or grippers and a spring pressed pin on said carrier, said gripper or grippers having an opening near the end thereof, and said pin being adapted to enter said opening, said gripper or grippers being adapted to seize said patches, one at a time, and secure the same to said pin, which is adapted to take a positive hold of said patches and recede into said patch carrier, when brought into contact wit said blank bed, and thereby release said patches and apply the same to said blanks, a means for normally actuating said gripper or grippers and a means for imparting a quick and sudden motion to said gripper or grippers during the operation of seizing said patches of transparent paper.

7. In a machine for making window envelop blanks, a patch applying mechanism comprising a means for cutting a strip of transparent paper into patches, a means for supporting said patches during the cutting operation, a rotary carrier for said patches, a gripper or grippers on said carrier adapted to seize said patches one at a time and transfer the same to said blanks in the rotation of said carrier, a means for normally actuating said gripper or grippers, and an oscillating member, operatively connected to said mechanism, and adapted to impart a quick and sudden motion to said gripper or grippers during said operation of seizing said patches.

8. A machine for making window envelop blanks, comprising a mechanism for cutting window openings in envelop blanks and a gumming mechanism, combined with a means for feeding said blanks through the machine, said cutting mechanism including a suitable stripping plate adapted to support said blanks during the operation of cutting said openings, and said feeding means being adapted to have a continuous motion in one direction and to be brought out of contact with said blanks during said operation of cutting said openings.

9. In a machine for making window envelop blanks, a patch applying mechanism comprising a rotary carrier for patches of transparent paper, a blank bed in contact with said rotary carrier, a gripper or grippers mounted on said rotary carrier adapted to seize a patch of transparent paper and secure it to said patch carrier, a means for holding said patch on said patch carrier, said holding means being adapted to coöperate with said gripper or grippers and to release said patch, when brought into contact with said blank bed, and thereby apply said patch to said blank.

10. In a machine for making window envelop blanks, a patch applying mechanism comprising a rotary carrier for patches of transparent paper, a suitable gripper or grippers on said carrier, said gripper or grippers being adapted to seize said patches one at a time and transfer the same to said blanks in the rotation of said carrier, and a means for normally actuating said gripper or grippers, said means comprising a suitable spindle pivotally connecting said gripper or grippers to said carrier, a suitable spring for keeping said gripper or grippers open, a revolving arm connected to said spindle and adapted to revolve therewith, and a deflecting member adapted to intercept the outer end of said revolving arm during a proper phase in its revolution, thereby closing said gripper or grippers against the tension of said spring.

11. In a machine for making window envelop blanks, a patch applying mechanism comprising a rotary carrier for patches of transparent paper, a suitable gripper or grippers on said carrier, said gripper or grippers being adapted to seize said patches one at a time and transfer the same to said blanks in the rotation of said carrier, and a means for normally actuating said gripper or grippers, said means comprising a suitable spindle pivotally connecting said gripper or grippers to said carrier, a suitable spring for keeping said gripper or grippers open, a revolving arm connected to said spindle and adapted to revolve therewith, and a curved plate adapted to intercept the outer end of said revolving arm during a proper phase in its revolution, thereby closing said gripper or grippers against the tension of said spring.

12. A machine for making window envelop blanks, comprising means for feeding successive blanks, a stop for arresting the movement of each blank, means carried by said stop for preventing the rebound of a blank therefrom, mechanism for punching a window in each blank during its period of rest, and means for continuing the feeding of each blank after the punching operation.

13. In a machine for making window envelop blanks, a patch applying mechanism comprising a rotary carrier for patches of transparent paper, a blank carrier, a gripper or grippers pivotally connected to said rotary carrier, a suitable socket secured to said rotary carrier flush with the periphery thereof, a suitable pin adapted to slide in the upper end of said socket and extend beyond the periphery of said carrier, a spring in said socket adapted to press said pin outwardly, said gripper or grippers having an opening near the end thereof, and said pin being adapted to enter said opening, said gripper or grippers being adapted to seize said patches, one at a time, and secure the same to said pin, which is adapted to take a positive hold of said patches and recede into said socket, when brought into contact with said blank carrier, and thereby release said patches and apply the same to said blanks, and a means for actuating said gripper or grippers.

14. In a machine of the class described, rotating means for the movement of patches, rotating means coöperating therewith for the movement of blanks and the simultaneous application of a patch to each blank, and a patch piercing means carried by said first rotating means, and adapted to be retracted by contact with said second rotating means, to release said patch.

15. In a machine of the class described, rotating means for the movement of patches, patch gripping means carried thereby, and patch piercing means rendered operative by the actuation of said gripping means, and adapted to retain each patch on said rotating means after the release of said patch by said gripping means.

16. In a machine of the class described, coöperating rotating members for the movement of successively fed blanks, a patch piercing device carried by one of said rotating means, and yieldingly projected beyond its surface, and means for impaling a patch on said device.

Dated this eighteenth day of February, 1918.

SAMUEL FURMAN.

Witnesses:
NELLIE WHALEN,
PENELOPE COMBERBACH.